Y. F. WRIGHT.
Hand Seed Planter and Fertilizer Distributor.
No. 122,980.                      Patented Jan. 23, 1872.
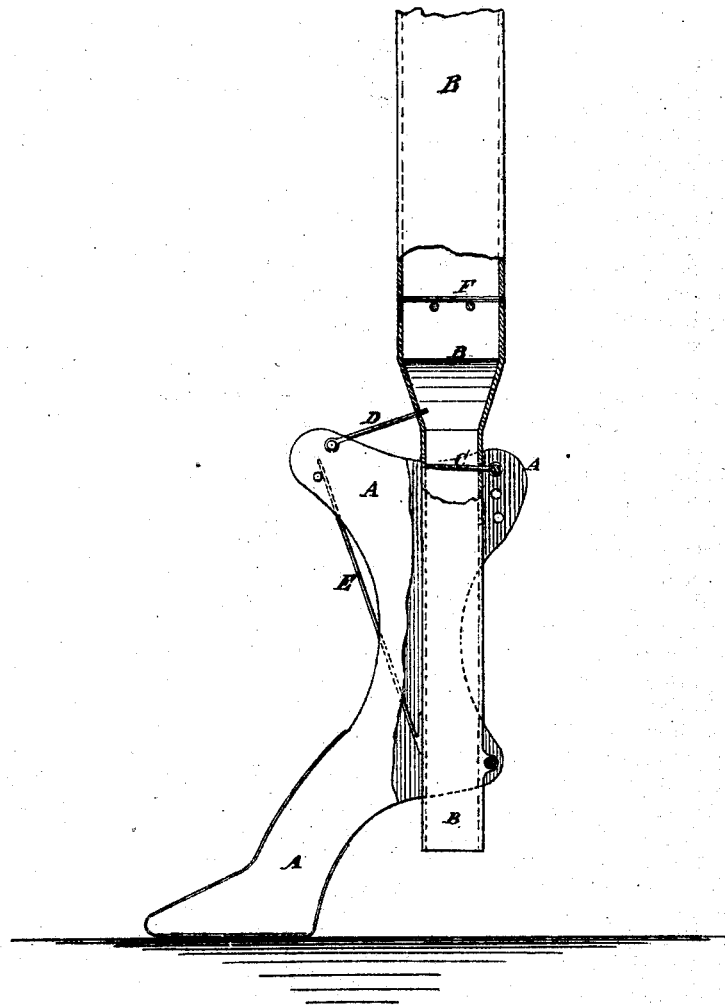
Witnesses:
A. W. Almqvist
Francis McArdle
Inventor:
Young F. Wright.
Per Munn & Co.
Attorneys.

122,980

UNITED STATES PATENT OFFICE.

YOUNG F. WRIGHT, OF HANNAHATCHEE, GEORGIA.

IMPROVEMENT IN HAND-PLANTERS.

Specification forming part of Letters Patent No. 122,980, dated January 23, 1872.

*To all whom it may concern:*

Be it known that I, YOUNG F. WRIGHT, of Hannahatchee, in the county of Stewart and State of Georgia, have invented a new and useful Improvement in Hand Seed-Planter and Fertilizer Distributer; and I do hereby declare that the following is a full, clear, and exact description thereof, which will enable others skilled in the art to make and use the same, reference being had to the accompanying drawing forming part of this specification, in which the figure is a side view of my improved machine partly in section to show the construction.

My invention has for its object to furnish a simple, convenient, and reliable hand-machine for dropping seeds and distributing fine fertilizers; and it consists in the construction and combination of the various parts of the machine, as hereinafter more fully described.

A is the lower part of the machine, which is made of sheet metal or other suitable material. The part A is made somewhat in the shape of a boot, as shown in the figure, and with its upper part or leg hollow to receive the lower end of the upper part B, which is pivoted near its lower end to the lower rear part or heel of the part A, as shown in the figure. The part B above the upper end of the part A is enlarged to serve as a reservoir for the seed or fertilizer, and should be provided, at its upper end, with a handle, so that the machine may be carried and operated as a cane. C is a valve or slide, made of wires, which pass in through holes in the rear side of the part B, and are pivoted at their outer ends to a pin or bolt passing through the rearward projecting parts of the upper end of the part A. Several sets of holes are made in the part A for the said bolt or pin, and in the part B for the said valve, so that, by adjusting the position of the said pin or bolt and valve, the amount of seed or fertilizer dropped at a time may be regulated at will. D is a valve or slide, made of wires, which pass through holes in the forward side of the part B, at such a distance above the slide or valve C that the space between the valves or slides C D may contain the amount of seed or fertilizer desired to be dropped at a time. The outer end of the valve D is pivoted to a pin or bolt passing through the forward projecting parts of the upper end of the part A. The pivoting-bolts or pins of the valves C D are at such a distance apart that when one of said valves may be within the valve B the other may be withdrawn from said parts. E is a spring, the lower end of which is secured to the lower part of the forward side of the part B, and the upper end of the said spring rests against a bolt or pin attached to the forward projections of the upper end of the part A, as shown in the figure, the spring D thus holding the upper end of the part A pressed forward, so that the lower valve C may be in the part B and the upper valve D may be out of said part. If, now, the lower end of the machine is pressed down upon the ground the upper valve D will be pressed inward, preventing the descent of the seed or fertilizer, and the lower valve C will be forced outward, allowing the seed or fertilizer in the space between the valves C D to drop to the ground. As the machine is raised from the ground the spring E acts to bring the valves C D into their former position, allowing the seed or fertilizer to descend to the lower valve C, again filling the space between the said valves. In the case of small seeds or a very fine fertilizer the valves C D may be plates of sheet metal or other suitable material. If desired a wire-grate, F, may be placed in the part B, above the upper valve D, to partially sustain the seed or fertilizer, and more especially to prevent it from packing.

Having thus described my invention, I claim as new and desire to secure by Letters Patent—

In combination with a boot-piece A and seed-reservoir B, pivoted at the heel thereof, the valves C D and spring E, arranged to operate as described, and for the purpose specified.

YOUNG F. WRIGHT.

Witnesses:
THOS. C. RUFFIN, Jr.,
DAVID HUDSON.